United States Patent
Townsend et al.

(10) Patent No.: US 9,923,446 B2
(45) Date of Patent: Mar. 20, 2018

(54) METHOD OF CONTROLLING THE SWITCHING OF A MULTILEVEL CONVERTER, A CONTROLLER FOR A MULTILEVEL CONVERTER, AND A COMPUTER PROGRAM FOR CONTROLLING A CONVERTER

(71) Applicant: ABB Schweiz AG, Baden (CH)

(72) Inventors: Christopher Townsend, Newcastle (AU); Hector Zelaya De La Parra, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/503,129

(22) PCT Filed: Aug. 11, 2014

(86) PCT No.: PCT/EP2014/067161
§ 371 (c)(1),
(2) Date: Feb. 10, 2017

(87) PCT Pub. No.: WO2016/023572
PCT Pub. Date: Feb. 18, 2016

(65) Prior Publication Data
US 2017/0237331 A1   Aug. 17, 2017

(51) Int. Cl.
*H02M 3/335* (2006.01)
*H02M 1/08* (2006.01)
*H02M 1/00* (2006.01)

(52) U.S. Cl.
CPC ......... *H02M 1/08* (2013.01); *H02M 3/33561* (2013.01); *H02M 2001/0054* (2013.01)

(58) Field of Classification Search
None
See application file for complete search history.

(56) References Cited

U.S. PATENT DOCUMENTS 8,619,446 B2 * 12/2013 Liu .................. H02M 1/12
363/71

8,982,593 B2 * 3/2015 Nondahl ............. H02M 1/12
363/36

(Continued)

FOREIGN PATENT DOCUMENTS

| WO | WO 2014/006200 A1 | 1/2014 |
| WO | WO 2014/023334 A1 | 2/2014 |
| WO | WO 2014/082655 A1 | 6/2014 |

OTHER PUBLICATIONS

Perez et al., "Predictive Control of AC-AC Modular Multilevel Converters", IEEE Transactions on Industrial Electronics, Jul. 2012, vol. 59, No. 7, XP011417620, pp. 2832-2839, pp. 2835-2836.

(Continued)

*Primary Examiner* — Jeffrey Gblende
(74) *Attorney, Agent, or Firm* — Birch, Stewart, Kolasch & Birch, LLP (57) ABSTRACT

A method of controlling a multilevel converter, a computer program and a controller for a converter is provided. The method includes determining a transition voltage from a control period to a following control period, analyzing the switching cells of each phase leg, selecting capacitors to provide the transition voltage and synthesize the output voltage for the following control period, and connecting the selected capacitors during the following control period. The analyzing of each switching cell includes analyzing a first switching leg and a second switching leg of the switching cell. The method includes determining whether a change of state of the first switching leg would contribute to the direction of the transition voltage, and determining whether a change of state of the second switching leg would contribute to the direction of the transition voltage, and determining the internal conditions of each of the first and the second switching leg that are determined as contributing to the transition. Thus, the two legs of the H-bridge are analyzed separately. The selecting of capacitors is performed by selecting the capacitors of the switching legs of the phase leg for the transition voltage on the basis of the determined internal conditions of the switching legs, including compar- (Continued)

ing the internal conditions of all the switching legs of the phase leg. A controller is configured to control the multilevel converter by performing the method.

18 Claims, 4 Drawing Sheets

(56) References Cited

U.S. PATENT DOCUMENTS

| | | | |
|---|---|---|---|
| 2010/0133816 A1* | 6/2010 | Abolhassani | H02K 3/28 290/44 |
| 2014/0049110 A1* | 2/2014 | Davies | H02M 5/271 307/52 |
| 2014/0049230 A1* | 2/2014 | Weyh | H02M 7/483 323/207 |

OTHER PUBLICATIONS

Townsend, "Multigoal Heuristic Model Predictive Control Technique Applied to a Cascaded H-Bridge StatCom", IEEE Transactions on Power Electronics, Mar. 2012, vol. 27, No. 3, pp. 1191-1200.

Zanchetta et al., "Predictive Current Control for Multilevel Active Rectifiers With Reduced Switching Frequency", IEEE Transactions on Industrial Electronics, Jan. 2008, vol. 55, No. 1, pp. 163-172.

* cited by examiner

METHOD OF CONTROLLING THE SWITCHING OF A MULTILEVEL CONVERTER, A CONTROLLER FOR A MULTILEVEL CONVERTER, AND A COMPUTER PROGRAM FOR CONTROLLING A CONVERTER

TECHNICAL FIELD

The invention relates to multilevel converters and especially to a method of controlling the switching of a multilevel converter.

BACKGROUND AND PRIOR ART

Figure 1:
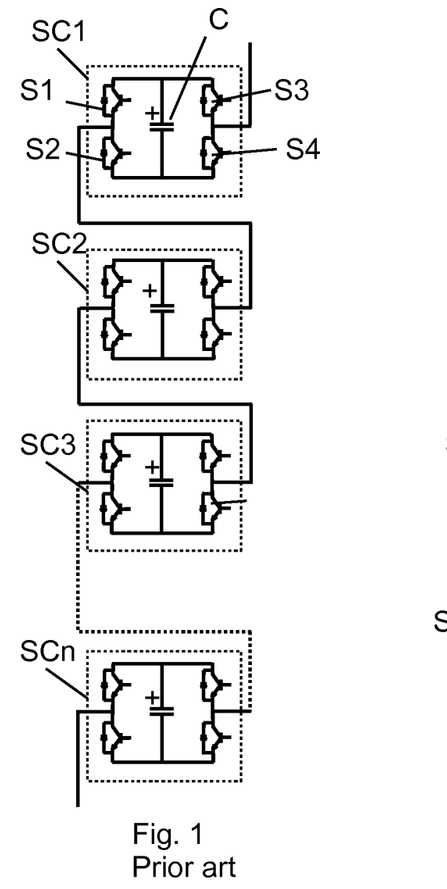
FIG. 1 illustrates a chain link for a converter, wherein the switching cells are analyzed in accordance with the prior art.

Multilevel converters are used in many high power applications for controlling active and reactive power at medium and high system voltages, such as in HVDC (High-Voltage, Direct Current) and FACTS (Flexible Alternating Current Transmission Systems) applications. A common multilevel converter comprises full-bridge switching cells, or H-bridges, each comprising four semiconductor switches and one capacitor, wherein the switching cells are arranged in chain links, one for each phase, and connected to the power system voltage via an inductor. The chain links are connected in a wye or delta configuration between the phases of the power system. FIG. 1 illustrates a chain link according to prior art comprising a number of switching cells SC1-SCn, each comprising four switches S1-S4 and a capacitor C.

In carrier-based modulation, the switching cells are controlled in order to synthesize an output voltage in accordance with a reference signal, wherein a carrier wave, usually triangular carrier, is used to determine the switching instants for each switching cell. However, the capacitor voltages may deviate from the nominal voltage, and to balance the capacitors, the on-times are controlled for each capacitor so as to increase or decrease their respective voltages. Such balancing may however create harmonic distortions.

In the article "Predictive Current Control for Multilevel Active Rectifiers With Reduced Switching Frequency", by Zanchetta, P.; Gerry, D. B.; Monopoli, V. G.; Wheeler, P. W.; in Industrial Electronics, IEEE Transactions on, vol. 55, no. 1, pp. 163, 172, January 2008 (Zanchetta et al), a method of using a reduced switching frequency for H-Bridge multilevel converters is described. The method predicts the state of the control period from the present state and limits the switching between the control periods. This method synthesizes the voltage output with a low harmonic distortion and low switching losses. However, using this modulation strategy does not necessarily provide a good balance of the capacitor voltage levels, and will also provide an unequal distribution of losses among the switches.

A number of requirements should be met for a good modulation strategy including, for example:
A) synthesize the output voltage in accordance with the reference voltage;
B) minimize the switching loss, i.e. minimize the number of times the switching cells are switched;
C) balance the voltage levels of the capacitors;
D) balance the loss distributions among the valves (or switching units), since the switches gets hot during use;
E) provide a satisfactory harmonic performance.

Thus, the quality of the output voltage should fulfil the voltage reference (A) and have a low harmonic distortion (E). Also, the modulation strategy should address problems that may arise in the converter itself; minimize switching losses (B), balance the capacitors (C) and balance the losses (D).

The control strategy of Zanchetta et al suffers from uneven balances of voltage levels of the capacitors (C), and an unbalanced loss distribution (D).

In the article "Multigoal Heuristic Model Predictive Control Technique Applied to a Cascaded H-Bridge StatCom", by Christopher D. Townsend, in Power Electronics, IEEE Transactions on, Vol. 27, No. 3, March 2012 (Townsend) an MPC (Model Predictive Control) modulation strategy is presented. The modulation strategy of Townsend provides a satisfying balance also between the voltage levels of the capacitors (C). However, the loss distribution is not handled by this MPC strategy.

There exists many other examples that uses MPC. A main idea with MPC is to predict the behavior of the load current for each possible voltage vector generated by the converter. In general, a cost function that represents the desired behavior of the system is used. The future switching of the converter cells is obtained by minimizing the cost function.

However, a problem with using MPC schemes, such as provided by Townsend, is that it requires many calculations in order to evaluate the cost functions. Townsend uses Heuristic models to lessen the computational load. However, the computational load has an exponential relationship to the number of voltage levels. Therefore the computational load is typically infeasible in FACTS applications that uses more than 8-10 serially connected switching cells.

Thus, a modulation strategy that handles all the requirements A)-E), is needed, and a modulation strategy that does not require an unfeasible amount of computational power is especially needed for converter applications where the number of switching levels are large.

SUMMARY OF THE INVENTION

An object of the invention is therefore to provide a method of controlling the switching in a multilevel converter and provide a suitable modulation strategy, keeping the computational load at a low level to allow for multilevel converters having a large number of switching levels.

A further object of the invention is to provide a method of controlling switching of multilevel converters that satisfies the requirements for the output voltage and harmonic distortions and can be used to provide low switching loss, good balance of capacitor voltages and a balanced loss distributions among the switching units also for multilevel converters with a large number of levels by keeping the computational load at a feasible level.

In a first aspect, the present invention provides such a control method for a multilevel converter.

The invention provides a method of controlling a multilevel converter connected to a power system, which multilevel converter comprises a phase leg for each phase of the power system. Each phase leg comprises a plurality of serially connected switching cells, wherein each switching cell consists of an H-Bridge cell comprising four switches and a capacitor. For each phase leg the method includes:
  obtaining electrical properties of the phase leg;
  determining the transition voltage from a control period to a desired state of a following control period,
  analyzing the switching cells of the phase leg,
  selecting capacitors to provide the transition voltage and synthesize the output voltage for the following control period, and connecting the selected capacitors during the following control period.

Especially, the analyzing of each switching cell (SC1; SC2; SC3; SCn) comprises:

analyzing a first switching leg and a second switching leg of the switching cell of the capacitor, which first switching leg comprises a first and second switch for connecting the capacitor to the phase leg, and which second switching leg comprises a third and a fourth switch for connecting the capacitor to the phase leg. The analysis of the first switching leg and the second switching leg of the switching cell includes:

determining whether a change of state of the first switching leg would contribute to the direction of the transition voltage, and determining whether a change of state of the second switching leg would contribute to the direction of the transition voltage, and determining the internal conditions of each of the first and the second switching leg that are determined as contributing to the transition.

The selecting of capacitors is performed by selecting the capacitors of the switching legs of the phase leg for the transition voltage on the basis of the determined internal conditions of the switching legs, including comparing the internal conditions of all the switching legs of the phase leg.

By analyzing the first and second leg of each switching cell instead of analyzing the switching cell as one unit, the computational load will be much lower, which is especially useful for converters with many levels.

The internal conditions that are determined preferably includes switching losses, conduction losses and capacitor voltage, so that a balancing of these losses and of the capacitor voltages can be provided among the switching cells.

In an embodiment, the determining of the internal conditions of each of the first switching leg and the second switching leg of each switching cell comprises estimating the switching losses for the switches of each switching leg.

Preferably the estimating of the switching losses includes an estimation of accumulated switching losses of each switch.

In an embodiment, the determining of the internal conditions of each of the first switching leg and the second switching leg of each switching cell comprises estimating the conduction losses for the switches of each switching leg.

Preferably, the estimating of the conduction losses for the switches includes an estimation of accumulated conduction losses of each switch.

In an embodiment, the determining of the internal conditions of each of the first switching leg and second switching leg of each switching cell comprises estimating the deviation of the voltage level of the capacitor connected to the switching leg.

In an embodiment, the method includes ranking the switching legs of the switching cells of the phase leg on the basis of the determined internal conditions, and using the ranking for performing the selecting of capacitors to provide the transition voltage and synthesize the output voltage for the following control period.

In a second aspect, the present invention provides such a controller for a multilevel converter.

According to the second aspect, the invention provides a controller for controlling the switching of the switching cells of a multilevel converter comprising at least one phase leg wherein a number of the switching cells are serially connected into a chain link, each switching cell comprising four switches and a capacitor in an H-bridge configuration. The controller is configured to select capacitors of the switching cells that should be connected to each phase leg of the converter during the following control period on the basis of a voltage reference signal for the following control period. The controller comprises a transition determiner configured to determine the voltage transition that should be provided from a present control period to the following control period, and the controller is configured to select capacitors to provide the voltage transition. Especially, the controller comprises:

a cell leg analyzer configured for analyzing each switching cell by analyzing each of a first and a second switching leg of the switching cell, wherein the first switching leg comprises the first switch and the second switch of the switching that are arranged in a half-bridge to the capacitor of the switching cell, and wherein the second switching leg comprises the third switch and the fourth switch of the switching cell that are arranged in a half-bridge to the capacitor of the switching cell, a contribution determiner configured to determine whether a potential switching of each switching leg contributes to the direction of the voltage transition or not, and an internal analyzer configured to evaluate the internal conditions for each switching leg that has been determined to be able to make a contribution to the direction of voltage transition. The controller is adapted to select capacitors for providing the voltage transition for the next control period on the basis of the evaluation of internal conditions provided by the internal analyzer.

In an embodiment of the controller, the internal conditions comprises at least one of the following:

the accumulated switching losses of each switch of the switching leg;

the accumulated conduction losses of each switch of the switching leg; and the voltage level of the capacitor of the switching leg.

Preferably, the internal conditions comprises the accumulated switching losses, the accumulated conduction losses and the voltage level of the capacitor.

In an embodiment, the controller comprises a leg ranking unit configured to rank the switching legs in the phase leg based on the evaluation of the internal conditions.

In a third aspect, the invention provides a computer program for controlling a multilevel converter. The computer program is storable on a medium such as a memory and enables a controller of a converter to perform a method of controlling the converter.

Thus, the third aspect of the present invention provides a computer program for controlling a multilevel converter, which computer program when run by a controller of the multilevel converter enables the controller to:

determine a transition voltage from a control period to a desired state of a following control period, analyze the switching cells of a phase leg of the converter, which switching cells each consists of an H-Bridge cell comprising four switches and a capacitor, select capacitors of the switching cells to provide the transition voltage and synthesize the output voltage for the following control period, and connect the selected capacitors during the following control period.

The computer program is characterized in that it enables the controller to perform the analyzing for each switching cell of the phase leg by:

analyzing a first switching leg and a second switching leg of the switching cell of the capacitor, which first switching leg comprises a first and second switch for connecting the capacitor to the phase leg, and which second switching leg comprises a third and a fourth switch for connecting the capacitor to the phase leg, and which analysis of the first switching leg and the second switching leg of the switching cell includes:
determining whether a change of state of the first switching leg would contribute to the direction of the transition voltage, and determining whether a change of state of the second switching leg would contribute to the direction of the transition voltage, and
determining the internal conditions of each of the first and the second switching leg (SL2) that are determined as contributing to the transition, wherein the selecting of capacitors is performed by the controller by selecting the capacitors of the switching legs of the phase leg for the transition voltage on the basis of the determined internal conditions of the switching legs, and includes comparing the internal conditions of all the switching legs of the phase leg.

In an embodiment, the determining of the internal conditions of each of the first switching leg and second switching leg comprises at least one of the following, preferably all three of the following:

estimating the accumulated switching losses for the switches of each switching leg;
estimating the accumulated conduction losses for the switches of each switching leg; and
estimating the deviation of the voltage level of the capacitor connected to the switching leg in question.

DETAILED DESCRIPTION OF EMBODIMENTS

FIG. 1 illustrates a chain link in accordance with prior art comprising a number of serially connected H-bridge switching cells SC1, SC2, SC3, . . . , SCn, each comprising four switches S1, S2, S3, S4 in an H-bridge configuration with a capacitor C. In the prior art, the control of the connection of the capacitors for a control period includes an analysis being performed for each switching cell SC1-SCn, as indicated by dotted lines surrounding each switching cell SC1-SCn.

Figure 2:
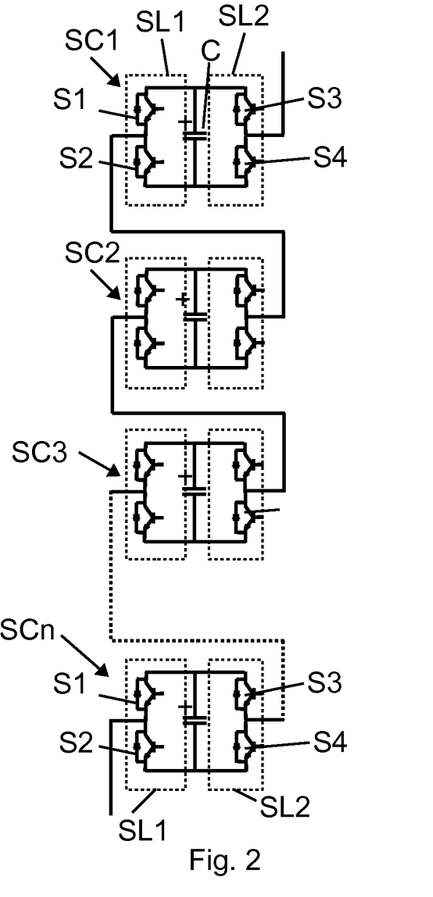
FIG. 2 illustrates analyzing switching legs of the switching cells of a multilevel converter according to the invention.

FIG. 2 illustrates a chain link in accordance with the invention. The configuration is the same as in the prior art. However, according to the invention, the analysis performed for controlling the connection of the capacitors C of the switching cells SC1-SCn is performed as two analysis for each switching cell SC1-SCn. One analysis is performed for a first switching leg SL1 of each switching cell SC1-SCn, and one analysis is performed on a second switching leg SL2 of each switching cell SC1-SCn. The analyses are performed for the first switching leg SL1 and the second switching leg SL2 as indicated by the dotted lines surrounding each of the switching legs SL1, SL2 of each switching cell SC1, SC2, SC3, . . . , SCn.

The first switching leg SL1 comprises a first and a second switch S1, S2 in a half-bridge configuration connected to the capacitor C at one side of the switching cell SC1-SCn, which can be referred to as the input of the switching cell SC1-SCn. The second switching leg SL2 comprises a third and a forth switch S3, S4 in a half-bridge configuration connected to the capacitor C, at the opposite side, referred to as the output, of the switching cell SC1-SCn. In accordance with the invention, each switching cell SC1-SCn is analyzed by means of an analysis of both the first switching leg SL1, and the second switching leg SL2.

The switching of the two sides is seen as independent from each other. In the first switching leg SL1, either the first switch S1 or the second switch S2 is closed. For example, when the first switch S1 of a switching leg SL1 in for example the first switching cell SC1 is closed, the switching cell will provide a 0 or −1 voltage level in dependence of the state of the second switching leg SL2. When the first switching leg SL1 changes its state, by opening the first switch S1 and closing the second switch S2, the switching cell SC1 will provide a +1 or 0 voltage level, respectively, in dependence of the second switching leg SL2. Thus, a change of state of the first switching leg SL1 will in this example, either change the output from the switching cell SC1 from a voltage level of 0 to 1, or from a voltage level of −1 to 0. Thus, a state of change of the first switching leg SL1 by opening the first switch S1 and closing the second switch S2 will change the output of the switching cell SC1 by a voltage level of +1. Thus, the change of state will be +1 when switching the first switching leg SL1 from a state with closed first switch S1 to a state with a closed second switch S2. A similar consideration can be made for the second switching leg SL2. In this way it is possible to deduce whether a change of the state of, i.e. a switching of, a switching leg SL1, SL2 will contribute to making the output of the chain link higher or lower. In accordance with the invention, the transition from the present output voltage of the chain link to the next control period is determined, which transition is determined by means of a reference voltage level for the next control period. An analysis of every switching leg SL1, SL2 of each switching cell SC1-SCn of the chain link is performed and if the voltage transition is positive, the switching legs SL1, SL2 that are capable of providing a positive contribution when they are switched will be selected for further analysis. The switching legs SL1, SL2 that will provide a negative contribution, and therefore cannot contribute to a positive transition of the voltage will be left in their respective current state for the next control period, and for these there is no need to perform a further analysis and may instead be omitted from the further analysis.

Thus, only those switching legs SL1, SL2 that can add to the desired transition of the voltage output of the phase leg chain link will be analyzed for selecting the capacitors to be connected or disconnected for the next control period.

Figure 3:
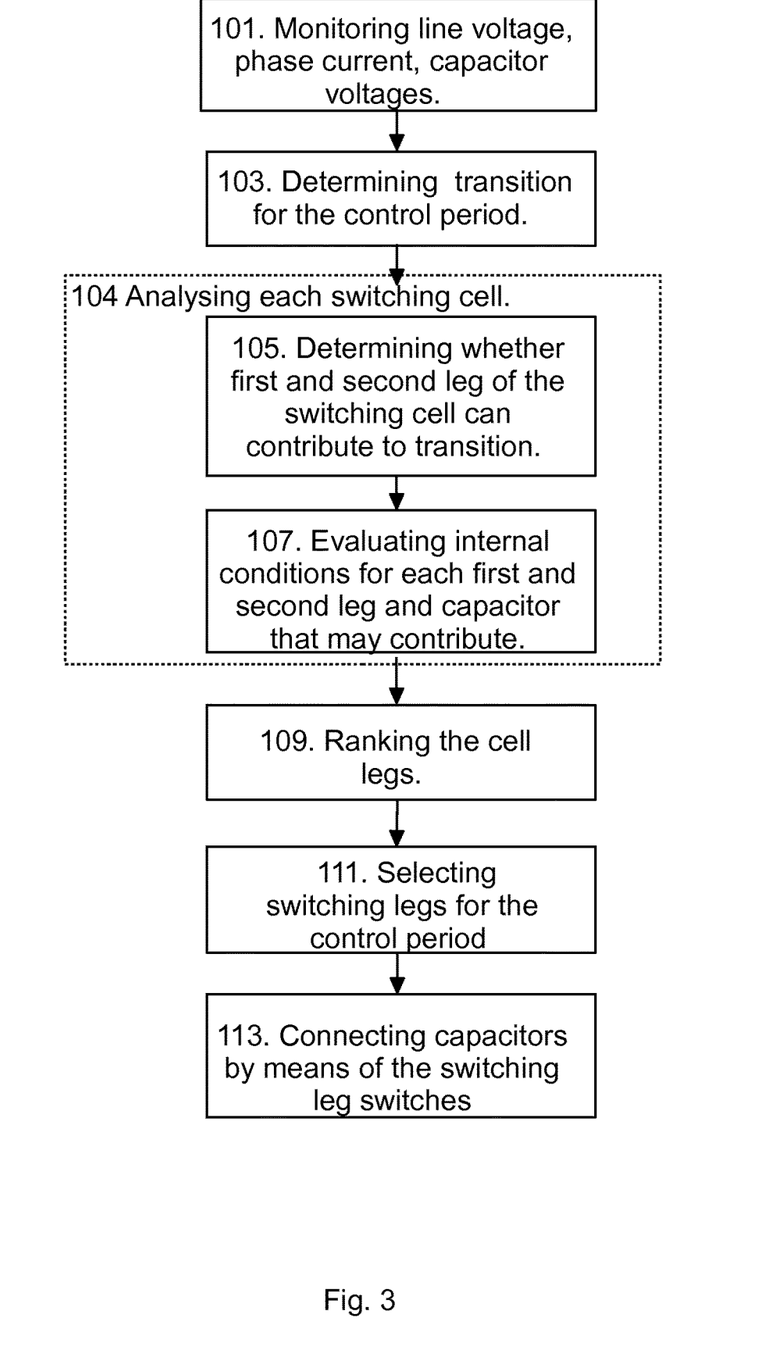
FIG. 3 illustrates a method for controlling a chain link of a converter according to the invention.

FIG. 3 illustrates a method for controlling a multilevel converter comprising a number, e.g. three, of phase legs, one phase leg for each phase of a power system connected to the converter.

The method starts with monitoring 101 the electrical conditions of the power system and the converter. The monitoring 101 includes obtaining, such as receiving, a measurement of the line voltage for each phase, a measurement of the current through each phase leg of the converter, and measurements of each capacitor voltage level $v_{cap}$ for each capacitor C of the converter. The monitoring also includes obtaining a voltage reference signal $v_{ref,\ k+1}$ for the following control period k+1, i.e. the control period k+1 that should be controlled, preferably receiving the voltage reference $v_{ref,\ k+1}$ from another controller of the converter, such as a current controller in a STATCOM system. The method is performed for a number of consecutive control periods: 1, 2, 3, . . . , k, k+1, . . . , n.

The method continues with determining 103 the transition of the voltage $v_{step}$ between the present voltage, e.g. the voltage at the end of the present control period k, and the reference voltage $v_{ref,\ k+1}$ of the control period k+1 in question, i.e. the voltage reference of the following control period k+1. The step voltage, or transition voltage, is preferably determined using the reference voltage for control period k+1 and the voltage at the end of control period k. The transition voltage $v_{step}$ is determined for each phase leg of the converter.

The step of determining 103 the transition of the control period k+1, includes comparing the reference voltage $V_{ref,\ k+1}$ for the control period k+1 to the voltage level at the end of the present control period k, which present voltage level is known. This can be described as:

$$V_{step,k+1} = V_{ref,k+1} - V_{app,k} \qquad \text{eq. 1}$$

wherein $V_{ref,\ k+1}$ is the reference voltage, calculated by for example the current controller, for the control period k+1, $V_{app,\ k}$ is the present voltage, i.e. the applied voltage at the end of the control period k immediately before the control period k+1, and $V_{step,\ k+1}$ is the voltage step that should be provided during control period k+1, i.e. the transition of the voltage.

The method continues with analyzing 104 each switching cell SC1, SC2, SC3, . . . , SCn. However instead of analyzing each switching cell SC1-SCn as one unit, each switching cell SC1-SCn is analyzed as two separate switching legs SL1, SL2. The analysis of the switching legs (SL1, SL2) of the switching cells (SC1, SC2, SC3, SCn) includes determining 105 whether the switching leg SL1, SL2 can contribute to the desired transition voltage for the next, or following, control period, and evaluating 107 the internal conditions of the switching leg SL1, SL2.

For an n-level converter having n switching cells per phase leg, the number of switching legs (SL1, SL2) are 2n. It should be noted that evaluating a change of state for each of the two switching legs of each switching cell instead of evaluating all the states of the switching cells will require a much smaller computational load. The computational load will be one change of state for each of the 2n switching legs, which can be compared to evaluating all possible states for a switching cell, as in the prior art, which is proportional to the size $4^n$. Thus, the computational load for a converter having 15 switching cells in series, will be 2*15=30, which is significantly less than the unfeasible computational load of $4^{15}$ for evaluating the states of all switching cells in a converter having 15 switching cells using the methods of the prior art.

The analysis 104 starts with determining 105 whether a change of state of a switching leg SL1, SL2 can contribute to the desired transition voltage. Thus, for each switching leg SL1, SL2 of the converter, the method includes determining 105 whether a switching, i.e. a change of state, of the switching leg SL1, SL2 will provide a contribution to the phase leg voltage that correspond to the direction of the transition voltage $v_{step}$. This means that for each switching leg it is determined whether a switching of that leg would provide a positive or negative contribution and if this contribution corresponds to the direction of the transition voltage, which is either positive or negative. Those switching legs SL1, SL2 that are found to be able to provide such a contribution to the transition voltage $v_{step}$ are selected for further analysis (steps 107, 109) and will possibly be selected (step 111) and subsequently switched (in step 113). Those switching legs SL1, SL2 that cannot contribute to the transition voltage $v_{step}$, will be left in their respective present switching state for the control period k+1 in question.

For those switching legs SL1, SL2 that can contribute to the transition voltage, the analysis 104 continues with evaluating 107 the internal conditions of each of these switching legs SL1, SL2.

For each switching cell SC1, SC2, SC3, SCn, the internal conditions of each switching leg SL1, SL2 that is able to contribute is evaluated. The evaluating 107 of internal conditions includes:

evaluating the capacitor voltage $v_{cap}$ of the capacitor C controlled by the switching leg SL1, SL2;

evaluating the switching losses of the switches S1, S2; S3, S4 of the switching leg SL1; SL2; and evaluating the conduction losses of the switches S1, S2; S3, S4 of the switching leg SL1; SL2.

The evaluating of the capacitor voltage $v_{cap}$ includes obtaining the present voltage level of the capacitor. The evaluating of the capacitor voltage $v_{cap}$ also includes determining whether the capacitor C will receive or loose energy if the respective switching leg SL1, SL2 of the capacitor C is switched during the control period k+1, which determination of energy direction is made on the basis of the direction of the phase leg current. Note that, for the first SL1 and the second SL2 switching leg of a switching cell SC1, the direction of the energy may be different. The evaluating of the capacitor voltage may include a comparison with a nominal voltage level or a comparison with a mean voltage level for all the capacitors C of the phase leg.

The evaluating of the capacitor voltage for each possibly contributing switching leg SL1, SL2 provides a measure of the influence on the capacitor voltage, which measure can be used to compare the possible switching of each switching leg SL1, SL2, with the possible switching of all the other switching legs SL1, SL2.

The evaluating of the switching losses for each possibly contributing switching leg SL1, SL2 should provide a measure of the switching losses of the switches S1, S2; S3, S4 of that switching leg SL1; SL2, respectively. As a basis for that measure of switching loss, the total number of switchings performed by each switch S1, S2, S3, S4 can be used. Thus, the switchings of each switch S1, S2, S3, S4 of each switching cell SC1, SC2, SC3, SCn may be counted so that a measure of the historical switching losses of each switch S1, S2, S3, S4 of the phase leg of the converter can be used to compare the switching losses experienced by every switch of the converter.

The evaluation of the switching losses may include estimating the switching loss for each control period during which the switch has been switched together with the magnitude of the current during that control period and the magnitude of the voltage of the capacitor C during that control period. The datasheet of the actual switch that is used can also be used for estimating the stress of the switch for control period on the basis of the current and capacitor voltage.

Similarly, the historically accumulated conduction loss of each switch S1, S2, S3, S4 of the phase leg of the converter can be estimated and all the switches can be compared in terms of their respective experienced total conduction loss. The conduction loss for each control period may be estimated using data for the switch, from a datasheet of the actual switch being used, together with the magnitude of the current during each control period for which the switch has been conducting. An alternative way of estimating the total (conduction and switching) loss of a switch is to measure, or sample, the temperature of the switch during the control periods, and summarize the temperature samples for each switch into an accumulated historical measure of experienced total loss for the switch. A datasheet of the switch can be used together with the measured temperatures to estimate the stress that the switch experiences for each control period.

By such comparisons of capacitor voltage levels, switching losses and conduction losses for each switching leg SL1, SL2, a selection of switching legs to be switched for the control period k+1 can be made, which selection will contribute to decreasing the differences of the internal conditions between the switching legs SL1, SL2 of all switching cells SC1, SC2, SC3, SCn of each phase leg of the converter.

The measures provided by the evaluating 107 of the internal conditions of each switching leg SL1, SL2 can serve as a basis for the next step of the method, which is a step of ranking 109 the switching legs SL1, SL2. The ranking 109 provides a ranking of appropriateness of selecting the switching legs SL1, SL2 for contributing to the voltage transition $v_{step}$ of the control period k+1.

The method continues with selecting 111 the highest ranked switching legs SL1, SL2, including matching the contribution to the voltage from each switching leg SL1, SL2 to the transition voltage $v_{step}$ that is needed for the control period k+1.

The method ends with connecting 113 the capacitors C by switching the selected switching legs SL1, SL2 so that the transition voltage $v_{step}$ is added to the phase voltage during the control period k+1. The times at which the switching legs of the phase leg are switched is dependent on the magnitude of the step voltage that must be synthesized within the control period.

Figure 4:
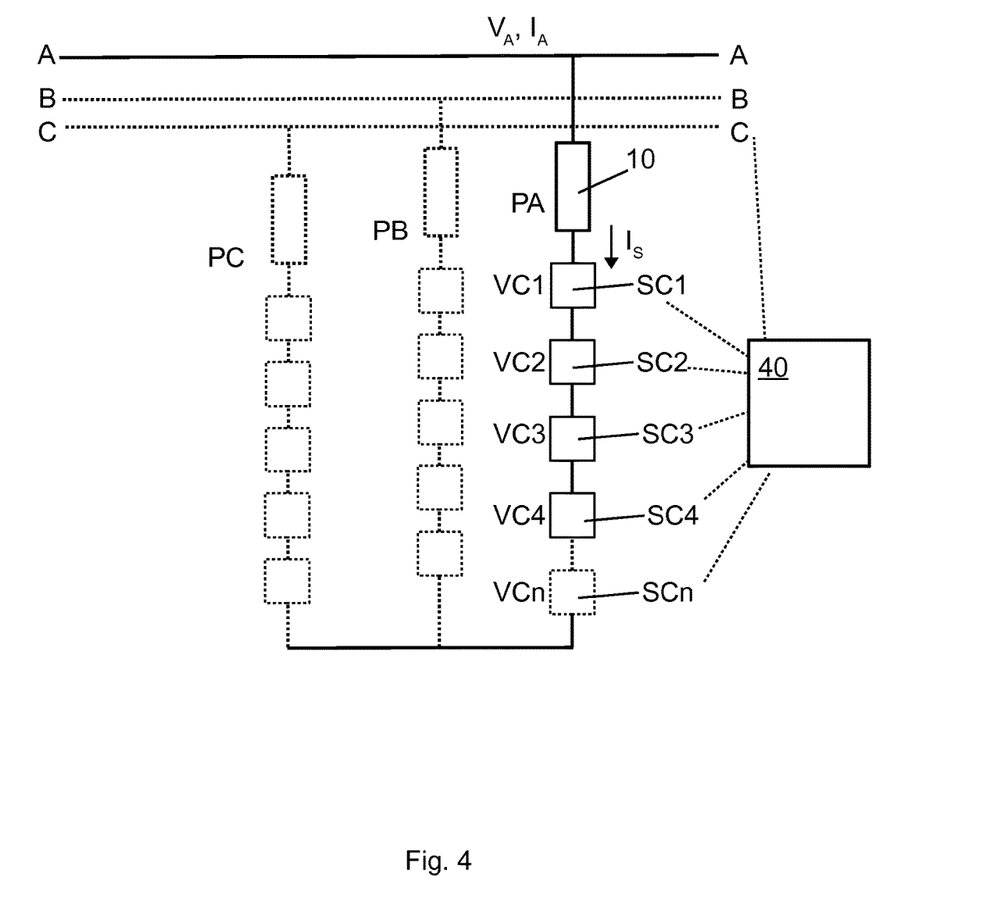
FIG. 4 illustrates a multilevel converter connected to a power system, which converter comprises a control unit for controlling the switching of the converter.

FIG. 4 illustrates a multilevel converter connected to a power system having three transmission lines, one for each phase A, B, C of the power system. The converter comprises three phase legs PA, PB, PC, and a controller 40, each phase leg PA, PB, PC being connected a corresponding phase A, B, C. Each phase leg PA, PB, PC comprises a number of switching cells SC1, SC2, SC3, SC4, SCn in a chain link and an inductor 10 connecting the chain link to the corresponding phase A, B, C of the power system. The phase legs PA, PB, PC are wye-connected. The controller 40 is configured for monitoring electrical properties of the power system and the phase legs PA, PB, PC, and is configured to control the switching of the switching cells SC1, SC2, SC3, SC4, SCn. The controller 40 is configured for monitoring each phase voltage $V_A$ and current $I_A$ of the power system, each current $I_S$ through each converter phase leg and the voltage level VC1, VC2, VC3, VC4, VCn of the capacitor of each switching cell SC1, SC2, SC3, SC4, SCn of each phase leg PA, PB, PC. The controller 40 may be a part of a control apparatus for the multilevel converter, and obtains a voltage reference signal for each of a number of consecutive control periods (1, 2, ..., k, k+1, ..., m) during which the switching cells should be controlled in order to synthesize a voltage level that is provided to each phase A, B, C of the power system.

Figure 5:
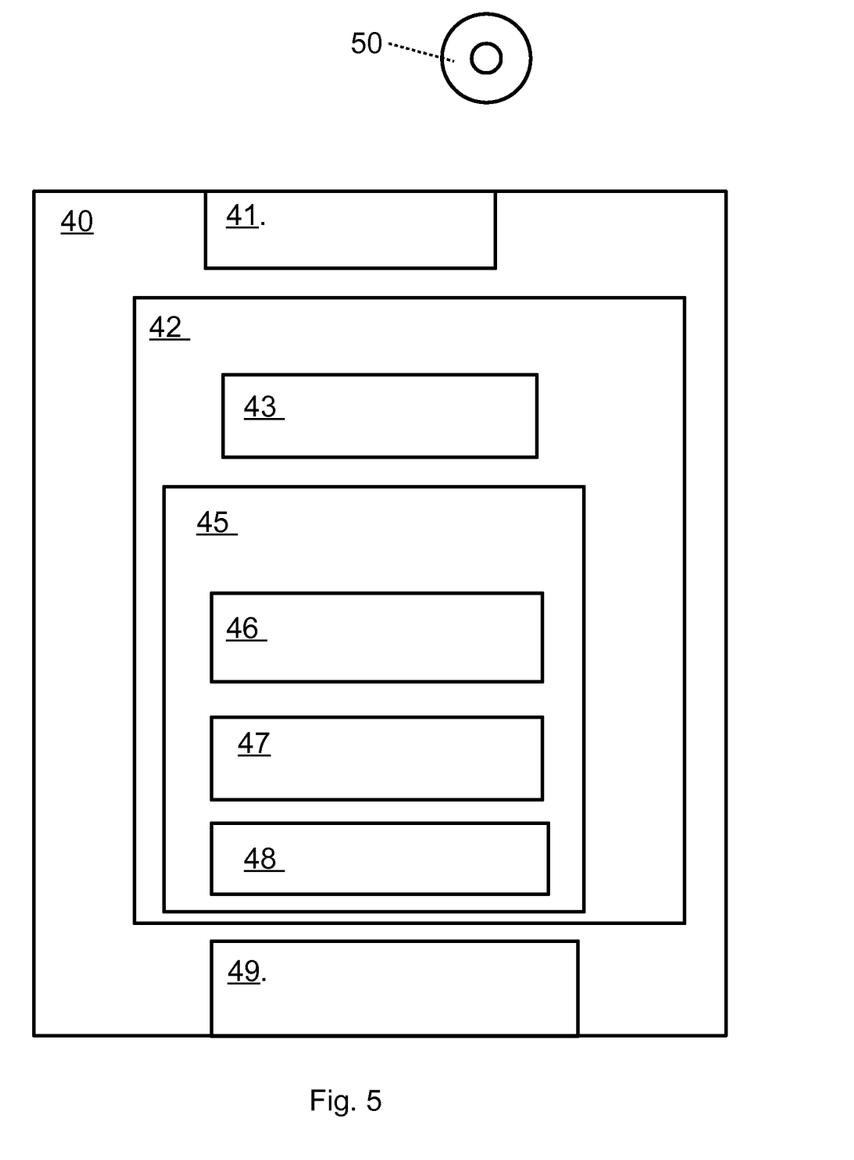
FIG. 5 illustrates a controller for controlling the switching of a converter.

The controller 40 is configured for performing the method of FIG. 3 and an embodiment of the controller 40 is further described in FIG. 5.

The controller 40 can be provided as a combination of hardware and software, and is illustrated comprising functional units that each are a combination of hardware and software for making the controller 40, which can be a programmed computer, perform its functions.

FIG. 5 illustrates an embodiment of a controller 40 for controlling the switching cells of a multilevel converter. The controller comprises an input for obtaining a power system voltage ($V_A$ in FIG. 4), the currents of the phase legs ($I_S$ in FIG. 4), the voltages of the capacitors (VC1-VCn in FIG. 4) of the switching cells (SC1-SCn) and a reference voltage $V_{ref}$. The controller 40 also includes an output 49 for providing control signal for the switching cells, and may control the switching by transmitting the control signal to other parts of the control apparatus of a multilevel converter, or to the switching cells directly. The controller 40 also includes a capacitor selector 42 configured to select capacitors for the control periods. The capacitor selector 42 comprises a transition determiner 43 configured to determine the transition voltage for the change of voltage that the converter should provide during the following control period (k+1). The capacitor selector 42 also comprises a cell leg analyzer 45 configured for analyzing the switching legs (SL1, SL2 in FIG. 2) that controls the capacitors of the switching cells.

The cell leg analyzer 45 comprises a contribution determiner 46 configured to determine (such as perform method step 105) whether the switching of a switching leg would contribute to the voltage transition that should be provided during the following control period k+1, and is configured to determine whether each of the switching legs of the converter provides such a contribution or not.

The cell leg analyzer 45 further comprises an internal analyzer 47 for the switching legs, which is configured to perform an analysis (such as perform method step 107) of the internal conditions of each switching leg that has been determined to be able to contribute to the transition voltage.

The cell leg analyzer 45 further comprises a leg ranking unit 48 configured to rank (such as perform method step 109) all the switching legs in each phase leg of the converter in view of their respective determined internal conditions.

The capacitor selector 42 is further configured to select the capacitors for the following control period k+1, by selecting which switching legs that should be switched during the control period k+1. The controller 40 is adapted to provide control signals corresponding to the selected capacitors so that the switches of the switching legs of the selected capacitors are switched during the following control period k+1.

The functions of the invention can be provided by means of a computer program, which when executed by a controller of a multilevel converter enables the controller to perform the functions of the controller 40 described with reference to FIGS. 4 and 5, and the method described with reference to FIGS. 2 and 3. Such computer program is illustrated as a computer program product 50 comprising computer code stored on a CD.

A method of controlling a multilevel converter and a controller for a converter has been described in embodiments. An embodiment, the method includes determining a transition voltage $v_{step}$ from a control period k to a following control period k+1, analyzing 104 the switching cells SC1, SC2, SC3, SCn of each phase leg, selecting 111 capacitors to provide the transition voltage and synthesize the output voltage for the following control period k+1, and connecting 113 the selected capacitors during the following control period k+1. Especially, the analyzing 104 of each switching cell SC1; SC2; SC3; SCn comprises analyzing 104 a first switching leg SL1 and a second switching leg SL1 of the switching cell SC1; SC2; SC3; SCn, and the method includes determining 105 whether a change of state of the first switching leg SL1 would contribute to the direction of the transition voltage, and determining 105 whether a change of state of the second switching leg SL2 would contribute to the direction of the transition voltage, and determining 107 the internal conditions of each of the first SL1 and the second switching leg SL2 that are determined as contributing to the transition. Thus, the two legs of the H-bridge are analyzed separately. The selecting 111 of capacitors is performed by selecting 111 the capacitors of the switching legs SL1; SL2 of the phase leg PA, PB, PC for the transition voltage on the basis of the determined internal conditions of the switching legs SL1, SL2, including comparing the internal conditions of all the switching legs SL1; SL2 of the phase leg PA, PB, PC. In an embodiment, the controller 40 is configured to control the multilevel converter by performing the method. The invention is however not limited to the examples given, but may be varied within the scope of the claims.

The invention claimed is:

1. A method for controlling a multilevel converter connected to a power system, the multilevel converter comprising a phase leg for each phase of the power system, each phase leg comprising a plurality of serially connected switching cells, wherein each switching cell consists of an H-Bridge cell comprising four switches and a capacitor,
wherein, for each phase leg, the method includes:
obtaining electrical properties of the phase leg;
determining a transition voltage from a control period to a desired state of a following control period;
analyzing the switching cells of the phase leg;
selecting capacitors to provide the transition voltage and synthesize an output voltage for the following control period; and
connecting the selected capacitors to the phase leg during the following control period,
wherein the analyzing of each switching cell comprises:
analyzing a first switching leg and a second switching leg of the switching cell, the first switching leg comprising a first switch and a second switch for connecting the capacitor to the phase leg, and the second switching leg comprising a third switch and a fourth switch for connecting the capacitor to the phase leg, and the analysis of the first switching leg and the second switching leg of the switching cell includes:
determining whether a change of state of the first switching leg would contribute an output voltage of the switching cell in a direction toward the transition voltage, and determining whether a change of state of the second switching leg would contribute the output voltage the switching cell in the direction toward the transition voltage; and
determining conditions of each of the first switching leg and the second switching leg that are determined to be able to contribute the output voltage the switching cell to the direction toward the transition voltage,
wherein the selecting of capacitors is performed by selecting the capacitors of the switching legs of the phase leg for the transition voltage based on the determined conditions of the switching legs, including comparing the conditions of all the switching legs of the phase leg with corresponding reference conditions.

2. The method according to claim 1, wherein the determining of the conditions of each of the first switching leg and the second switching leg of each switching cell comprises:
evaluating a capacitor voltage of the switching cell of the first switching leg and the second switching leg; or
evaluating switching losses for the switches of the first switching leg and the second switching leg; or
evaluating conduction losses for the switches of the first switching leg and the second switching leg.

3. The method according to claim 2, wherein the determining of the conditions of each of the first switching leg and the second switching leg of each switching cell comprises estimating the switching losses for the switches of each switching leg, wherein the estimating of the switching losses includes an estimation of accumulated switching losses of each switch.

4. The method according to claim 2, wherein the determining of the conditions of each of the first switching leg and the second switching leg of each switching cell comprises estimating the conduction losses for the switches of each switching leg, wherein the estimating of the conduction losses for the switches includes an estimation of accumulated conduction losses of each switch.

5. The method according to claim 2, wherein the determining of the conditions of each of the first switching leg and the second switching leg of each switching cell comprises estimating a deviation of the voltage level of the capacitor connected to the first switching leg and the second switching leg.

6. The method according to claim 2, further including:
ranking the switching legs of the switching cells of the phase leg based on the determined conditions; and
using the ranking for performing the selecting of capacitors to provide the transition voltage and synthesize the output voltage for the following control period.

7. A controller for controlling switching of the switching cells of a multilevel converter comprising at least one phase leg, wherein a number of the switching cells are serially connected into a chain link, each switching cell comprising four switches and a capacitor in an H-bridge configuration, wherein the controller is configured to select capacitors of the switching cells that should be connected to each phase leg of the multilevel converter during a following control period based on a voltage reference signal for the present control period, said controller comprising:
a transition determiner configured to determine a transition voltage that should be provided from the present control period to the following control period, and the controller is adapted to select capacitors to provide the transition voltage;
a cell leg analyzer configured for analyzing each switching cell by analyzing each of a first switching leg and a second switching leg of the switching cell, wherein the first switching leg comprises a first switch and a second switch of the switching cell that are arranged in a half-bridge connected to the capacitor of the switching cell, and wherein the second switching leg comprises a third switch and a fourth switch of the switching cell that are arranged in a half-bridge connected to the capacitor of the switching cell;

a contribution determiner configured to determine whether a potential switching of each switching leg contributes an output voltage of the switching cell in a direction toward the transition voltage or not; and an internal analyzer configured to evaluate conditions for each switching leg that has been determined to be able to contribute the output voltage of the switching cell in the direction toward the transition voltage, wherein the controller is adapted to select the selected capacitors for providing the transition voltage for the following control period based on the evaluation of the conditions provided by the internal analyzer.

8. The controller of claim 7, wherein the conditions comprises at least one of:

accumulated switching losses of each switch of the first switching leg and the second switching leg;

accumulated conduction losses of each switch of the first switching leg and the second switching leg; and a voltage level of the capacitor of the first switching leg and the second switching leg.

9. The controller of claim 8, wherein the conditions comprises the accumulated switching losses, the accumulated conduction losses and the voltage level of the capacitor.

10. The controller of claim 9, further comprising a leg ranking unit configured to rank the switching legs of the phase leg based on an evaluation of the conditions.

11. A computer program embodied on a non-transitory computer readable medium for controlling a multilevel converter, wherein the computer program, when run by a controller of the multilevel converter, enables the controller to:

determine a transition voltage from a present control period to a desired state of a following control period;

analyze switching cells of a phase leg of the multilevel converter, wherein each of the switching cells consists of an H-Bridge cell comprising four switches and a capacitor;

select capacitors of the switching cells to provide the transition voltage and synthesize an output voltage for the following control period; and connect the selected capacitors to the phase leg during the following control period, wherein the analyzing for each switching cell of the phase leg comprises:

analyzing a first switching leg and a second switching leg of the switching cell, the first switching leg comprising a first switch and second switch for connecting the capacitor to the phase leg, and the second switching leg comprising a third switch and a fourth switch for connecting the capacitor to the phase leg, and the analysis of the first switching leg and the second switching leg of the switching cell includes:

determining whether a change of state of the first switching leg would contribute the output voltage the switching cell in the direction toward the transition voltage, and determining whether a change of state of the second switching leg would contribute the output voltage the switching cell in the direction toward the transition voltage; and determining conditions of each of the first switching leg and the second switching leg that are determined to be able to contribute the output voltage the switching cell to the direction toward the transition voltage, wherein the selecting of capacitors is performed by selecting the capacitors of the switching legs of the phase leg for the transition voltage based on the determined conditions of the switching legs, including comparing the conditions of all the switching legs of the phase leg with corresponding reference conditions.

12. The computer program according to claim 11, wherein the determining of conditions comprises:

evaluating a capacitor voltage of the switching cell of the first switching leg and the second switching leg; or evaluating switching losses for the switches of the first switching leg and the second switching leg; or evaluating conduction losses for the switches of the first switching leg and the second switching leg.

13. The computer program according to claim 12, wherein the determining of the conditions of each of the first switching leg and the second switching leg comprises estimating the switching losses for the switches of each switching leg, wherein the estimating of the switching losses includes an estimation of accumulated switching losses of each switch.

14. The computer program according to claim 12, wherein the determining of the conditions of each of the first switching leg and the second switching leg comprises estimating the conduction losses for the switches of each switching leg, wherein the estimating of the conduction losses for the switches includes an estimation of accumulated conduction losses of each switch.

15. The computer program according to claim 12, wherein the determining of the conditions of each of the first switching leg and the second switching leg of each switching cell comprises estimating a deviation of the voltage level of the capacitor connected to the first switching leg and the second switching leg.

16. The computer program according to claim 12, further including:

ranking the switching legs of the switching cells of the phase leg based on the determined conditions; and using the ranking for performing the selecting of capacitors to provide the transition voltage and synthesize the output voltage for the following control period.

17. The method according to claim 3, wherein the determining of the conditions of each of the first switching leg and the second switching leg of each switching cell comprises estimating the conduction losses for the switches of each switching leg, wherein the estimating of the conduction losses for the switches includes an estimation of accumulated conduction losses of each switch.

18. The method according to claim 3, wherein the determining of the conditions of each of the first switching leg and the second switching leg of each switching cell comprises estimating a deviation of the voltage level of the capacitor connected to the first switching leg and the second switching leg.

* * * * *